United States Patent
Li et al.

(10) Patent No.: US 12,438,186 B2
(45) Date of Patent: Oct. 7, 2025

(54) SOLID ELECTROLYTE WITH PROTRUSION AND ALL SOLID-STATE BATTERIES COMPRISING SAME

(71) Applicant: Factorial Inc., Woburn, MA (US)

(72) Inventors: Kwan Li, Reading, MA (US); Hosang Park, Winchester, MA (US)

(73) Assignee: Factorial Inc., Billerica, MA (US)

( * ) Notice: Subject to any disclaimer, the term of this patent is extended or adjusted under 35 U.S.C. 154(b) by 0 days.

(21) Appl. No.: 18/585,236

(22) Filed: Feb. 23, 2024

(65) Prior Publication Data

US 2024/0291028 A1  Aug. 29, 2024

Related U.S. Application Data

(60) Provisional application No. 63/487,287, filed on Feb. 28, 2023.

(51) Int. Cl.
*H01M 10/0585* (2010.01)
*H01M 10/0562* (2010.01)
*H01M 10/0583* (2010.01)

(52) U.S. Cl.
CPC ... *H01M 10/0562* (2013.01); *H01M 10/0585* (2013.01); *H01M 10/0583* (2013.01); *H01M 2300/0068* (2013.01)

(58) Field of Classification Search
CPC ......... H01M 10/0562; H01M 10/0583; H01M 10/0585
See application file for complete search history.

(56) References Cited

U.S. PATENT DOCUMENTS

| 10,581,047 | B2 | 3/2020 | Park et al. |
| 11,380,966 | B2 | 7/2022 | Lee et al. |
| 2013/0149579 | A1 | 6/2013 | Park |
| 2018/0026308 | A1 | 1/2018 | Yamada et al. |
| 2019/0088982 | A1 | 3/2019 | Sugizaki et al. |
| 2023/0006243 | A1* | 1/2023 | Mizuno ............... H01M 50/533 |
| 2023/0163427 | A1* | 5/2023 | Yamamoto ........... H01M 50/10 429/161 |

FOREIGN PATENT DOCUMENTS

JP  2015041538 A  * 3/2015  ........ H01M 10/0562

OTHER PUBLICATIONS

JP2015041538 A Machine Translation (Year: 2015).*

* cited by examiner

*Primary Examiner* — Osei K Amponsah (57) ABSTRACT

A cell assembly has a plurality of first electrodes, a plurality of second electrodes and a plurality of solid electrolyte layers. The solid electrolyte layers have a protrusion in at least one of the solid electrolyte layers. The protrusion is aligned with a first electrode tab of one of the first electrodes. The folding of the first electrode tabs causes the protrusions to be positioned to separate the first electrode tabs from the second electrodes, thus preventing short circuit between the first electrode tabs and second electrodes. In one aspect, the disclosure provides an all solid-state battery comprising one or more anodes, one or more cathodes and one or more solid electrolyte layers with a protrusion. Also disclosed is a method for preparing same.

20 Claims, 8 Drawing Sheets

SOLID ELECTROLYTE WITH PROTRUSION AND ALL SOLID-STATE BATTERIES COMPRISING SAME

CROSS-REFERENCE

The present application claims priority of U.S. Ser. No. 63/487,287, filed Feb. 28, 2023, the entire content of which is incorporated herein by reference into this application.

FIELD

This disclosure relates to a solid electrolyte layer with a protrusion and all solid-state batteries comprising the same.

BACKGROUND

To ensure good conductance and low resistivity among electrode and electrolyte layers in an all solid-state battery (ASSB), a high compression is usually applied during assembly. However, this compression increases the risk of internal short circuits wherein part of the anode layer, such as the edge, can contact part of the cathode layer. Notably, this short circuit is likely to occur near the tab when the anode and cathode current collectors in a multilayer cell are folded and welded together.

The conventional method for assembling ASSB relies on a lower level of compression and/or uniaxial compression to reduce the risk of short circuits. However, neither case is ideal. A lower level of compression will result in a relatively higher internal resistance and thus reduce the cell performance in comparison to a higher level of compression. Uniaxial compression may lead to unsatisfiable performance. Thus, there remains a need for technologies addressing the short circuit issues.

SUMMARY

This disclosure provides a cell assembly with a solid electrolyte with a particular configuration or shape that reduces the risk of short circuits when applying high levels of compression during assembly of an electrochemical device, such as an ASSB, comprising the same.

In one aspect, this disclosure provides a cell assembly comprising:
1) a plurality of first electrodes, wherein each first electrode comprises a first electrode tab extended therefrom;
2) a solid electrolyte layer comprising a first protrusion; and
3) a second electrode,
   wherein the solid electrolyte layer is positioned between one of the plurality of first electrodes and the second electrode, and
   wherein the first electrode tab of the one of the plurality of first electrodes contacts another of the plurality of first electrodes, and
   wherein the first protrusion of the solid electrolyte layer is positioned to separate the first electrode tab of the one of the plurality of first electrodes from the second electrode to prevent a short circuit therebetween.

BRIEF DESCRIPTION OF THE FIGURES

Non-limiting embodiments of the present disclosure are described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure.

DETAILED DESCRIPTION OF THE DISCLOSURE

Disclosed herein is a cell assembly that allows for application of compression or pressure during manufacture while minimizing the risk of short circuits. In some embodiments, the present disclosure provides a cell assembly having a plurality of first electrodes, each first electrode having a first electrode tab extended therefrom; a plurality of solid electrolyte layers, at least one of the solid electrolyte layers having a first protrusion; and a plurality of second electrodes, each second electrode having a second electrode tab extended therefrom. In some embodiments, the first protrusions of the solid electrolyte layers are aligned with a corresponding first electrode tab such that when the first electrode tabs are folded, the corresponding first protrusion is positioned between the first electrode tabs and one of the second electrodes. Having a first protrusion of a solid electrolyte layer positioned between the first electrode tab and the second electrode may prevent contact of the first electrode tab and the second electrode, thereby preventing a short circuit therebetween. Similarly, in some embodiments the solid electrolyte layers may have second protrusions and the second protrusions of the solid electrolyte layers are aligned with a corresponding second electrode tab such that when the second electrode tabs are folded, the corresponding second protrusion is positioned between the second electrode tabs and one of the first electrodes. Having a second protrusion of a solid electrolyte layer positioned between the second electrode tab and the first electrode may prevent contact of the second electrode tab and the first electrode, thereby preventing a short circuit therebetween. The presence of the first protrusion positioned between the first electrode tab and the second electrode and/or the second protrusion positioned between the second electrode tab and the first electrode may also enable greater compressive force to be used without a concern for causing a short circuit when folding the first electrode tabs and second electrode tabs which may lead to lower internal resistance in the cell assembly and better performance.

In some embodiments, the first electrode tabs are electrically connected, and the second electrode tabs are electrically connected. In some embodiments, the first and second electrodes refer to anode and cathode, respectively. In some embodiments, the first and second electrodes refer to cathode and anode, respectively. In some embodiments, the protrusion of the solid electrolyte layer is a part of the solid electrolyte layer or a separate component next to the solid electrolyte layer. In some embodiments, the protrusion is attached or adhered to the solid electrolyte layer.

In some embodiments, the first protrusions are geometrically aligned with the first electrode tabs and/or the second protrusions are geometrically aligned with the second electrode tabs.

In some embodiments, when the first and second electrode tabs are folded, the first protrusions are positioned to separate the first electrode tabs from the second electrodes, and the second protrusions are positioned to separate the second electrode tabs from the first electrode layers, thus preventing a short circuit between the first electrode tabs and the second electrodes and between the second electrode tabs and the first electrodes.

Figure 1A:
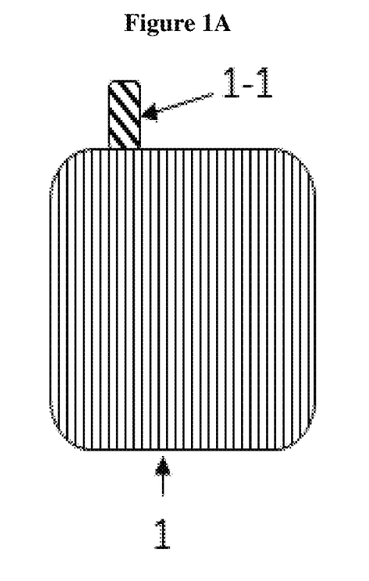
FIGS. 1A-1C show an exemplary structure of an anode layer, a solid electrolyte layer, and a cathode layer, respectively, according to one embodiment of the present disclosure.
Figure 1B:
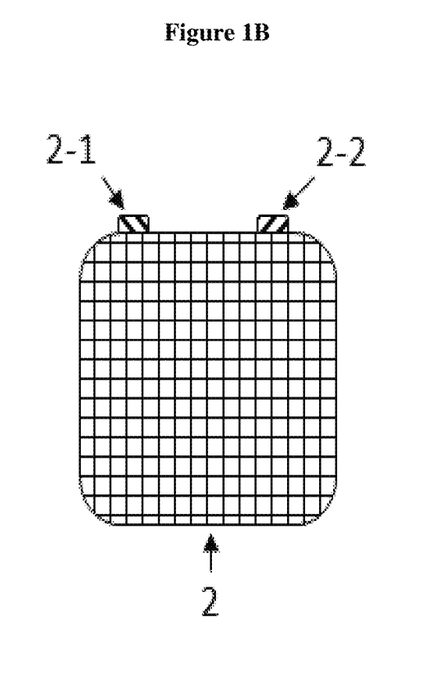
Figure 1C:
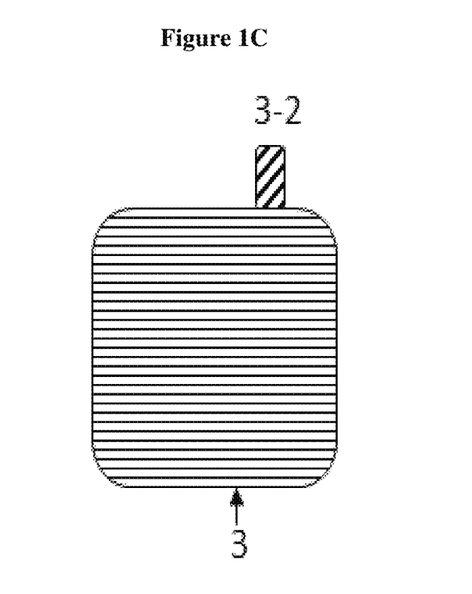
Figure 3A:
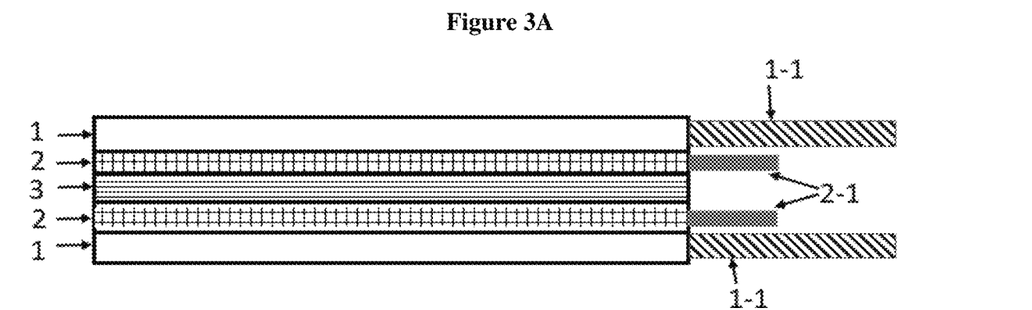
FIGS. 3A and 3B show a representative configuration of a cell assembly before and after folding the tabs, respectively, according to one embodiment of the present disclosure.
Figure 4A:
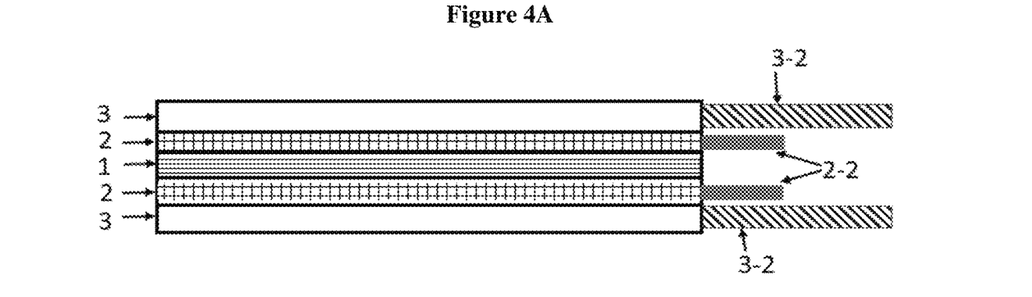
FIGS. 4A and 4B show a representative configuration of a cell assembly before and after folding the tabs, respectively according to one embodiment of the present disclosure.

A first electrode, a solid electrolyte layer, and a second electrode are representatively shown in FIGS. 1A-1C. The anode layer (1) has an anode tab (1-1) extending therefrom. The solid electrolyte layer (2) has a first protrusion (2-1) and a second protrusion (2-2). The cathode layer (3) has a cathode tab (3-2) extending therefrom. In some embodiments, as shown for example in FIGS. 3A and 4A the layers are stacked to form the cell assembly such that the layers alternate between anode layers (1) and cathode layers (3) with at least one solid electrolyte layer (2) positioned between each anode layer (1) and cathode layer (3). In some embodiments, one or multiple first protrusions (2-1) in a cell assembly are geometrically aligned (e.g., are the same or similar size and/or shape) with the anode tabs (1-1) in multiple anode layers and/or one or multiple second protrusions (2-2) in a cell assembly are geometrically aligned (e.g., are the same or similar size and/or shape) with the cathode tabs (3-2) in multiple cathode layers. In some embodiments, either anode tab (1-1) or the cathode tab (3-2) is located on a location or portion of the electrode other than the typical configuration as shown in FIGS. 1A and 1C. In some embodiments, an electrode tab is located on any side of a cell assembly, including the top or bottom. In some embodiments, the electrode tab is located at the front or back of cell assembly. In some embodiments, the anode and cathode tabs are located on the same side. In some embodiments, the anode and cathode tabs are located on the opposite or adjacent sides of a cell assembly.

Figure 3B:
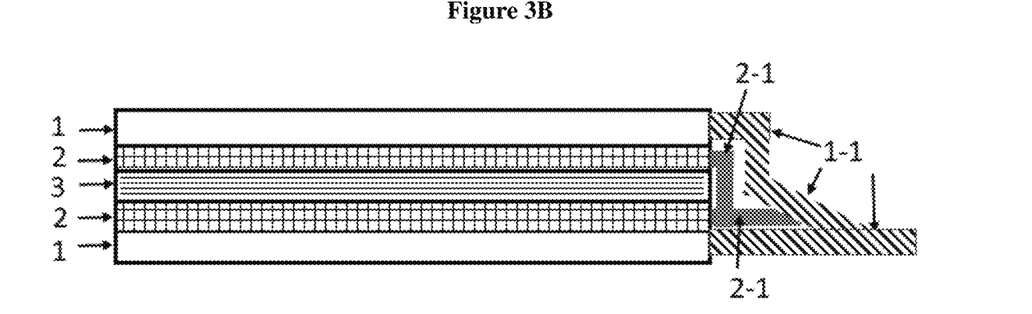

As representatively shown in FIG. 3B, when the anode tabs (1-1) are folded, at least one of the first protrusions (2-1) of the solid electrolyte (2) on either side of cathode layer (3) may be folded or arranged or otherwise positioned. The folded or arranged protrusions (2-1) are positioned to separate the anode tabs (1-1) from the cathode electrode layers (3), which prevents the short circuits therebetween. As can be seen in FIG. 3B, when an anode tab (1-1) is folded to contact another anode layer (e.g., an anode tab of another anode layer), at least one protrusion (2-1) of solid electrolyte layers (2) on either side of cathode layer (3) is positioned between folded anode tab (1-1) and cathode layer (3), thereby preventing contact and/or a short circuit.

Figure 4B:
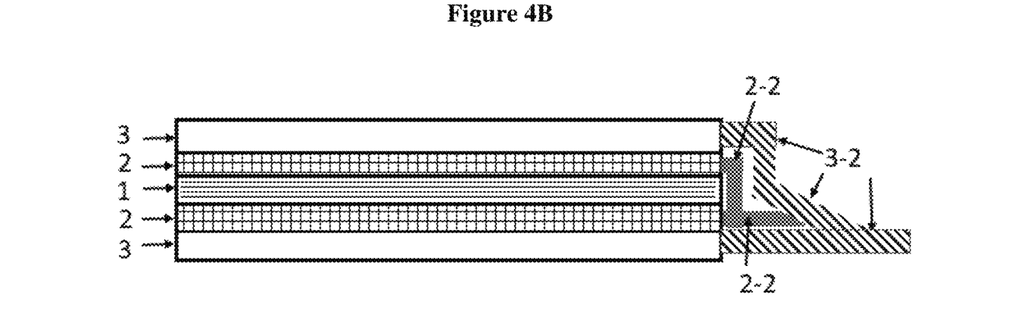

Also shown in FIG. 4B, in some embodiments, when the cathode tabs (3-2) are folded, at least one of the second protrusions (2-1) of the solid electrolyte (2) on either side of anode layer (1) may be folded or arranged or otherwise positioned. The folded or arranged second protrusions (2-2) are positioned separate the cathode tabs (3-2) from the anode layers (1), which prevents the short circuits therebetween. As can be seen in FIG. 4B, when a cathode tab (3-2) is folded to contact another cathode layer (e.g., a cathode tab of another cathode layer) at least one protrusion (2-2) of solid electrolyte layers (2) on either side of anode layer (1) is positioned between folded cathode tab (3-2) and anode layer (1), thereby preventing contact and/or a short circuit.

In some embodiments, the first and second protrusions (2-1 and 2-2) have a composition that is the same as or different from that of the solid electrolyte layers. In some embodiments, the protrusion is made of an electrically insulative material other than the solid electrolyte. In some embodiments, the first and second protrusions are the same composition as the solid electrolyte layer and are made by cutting a solid electrolyte layer (2) wherein the protrusions are an integral part of the solid electrolyte layer (2). In some embodiments, the first and second protrusions are attached to or placed next to the solid electrolyte layers before folding the tabs, and after the tabs are folded, the first and second protrusions are arranged or deployed in a configuration that physically separates and electrically insulates the tabs from the opposite electrode layers, as shown for example in FIGS. 3B and 4B.

Figure 5:
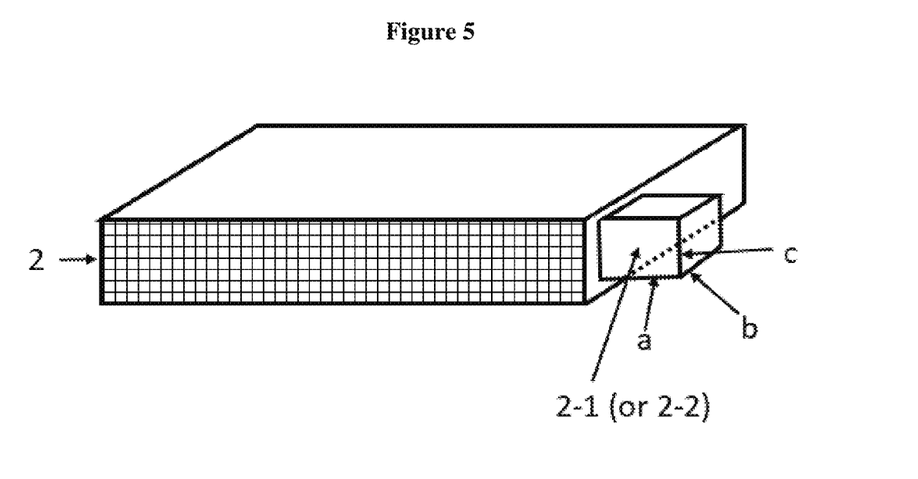
FIG. 5 shows a representative configuration of a protrusion extending from solid electrolyte layer according to one embodiment of the present disclosure.
Figure 6A:
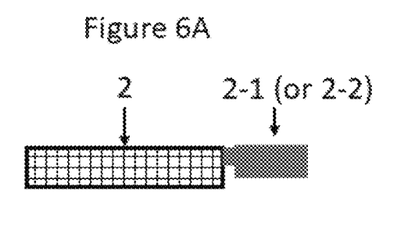
FIGS. 6A-6F show representative connections between the protrusion and solid electrolyte layer according to some embodiments of the present disclosure.
Figure 6B:
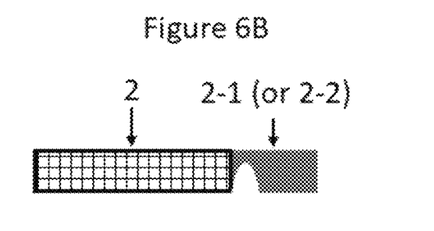
Figure 6C:
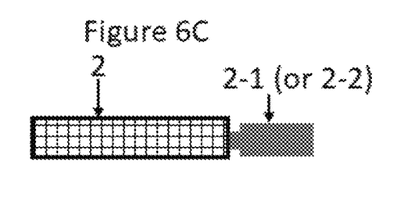
Figure 6D:
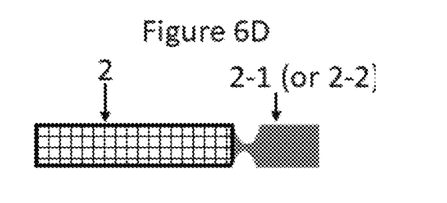
Figure 6E:
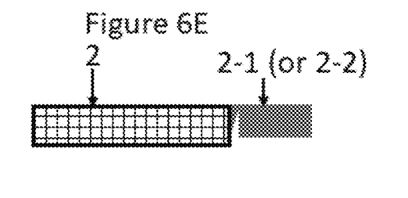
Figure 6F:
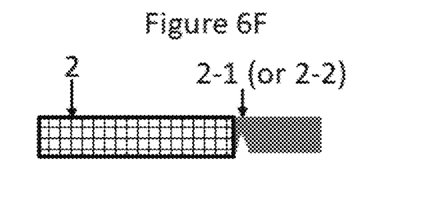

In some embodiments, the protrusion, either the first protrusion (2-1) or the second protrusion (2-2), has certain dimensions. As shown in FIG. 5, the protrusion has a length, width and thickness of a, b and c, respectively. In some embodiments, the protrusion (2-1) has a minimum length which allows the folded protrusion (2-1) to cover at least the cathode layer (3) adjacent to the electrolyte layer (2) as representatively shown in FIG. 3B. In some embodiments, the protrusion (2-1) has a maximum length which allows the folded protrusion (2-1) to cover both the cathode layer (3) adjacent to the electrolyte layer (2) and another electrolyte layer (2) below the cathode layer (3) as representatively shown in FIG. 7B.

Figure 2:
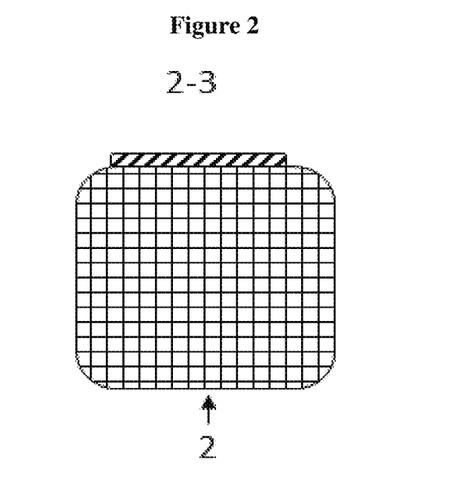
FIG. 2 shows an exemplary layout of a solid electrolyte layer according to one embodiment of the present disclosure.

In some embodiments, the protrusions, either the first or second protrusion, have a width of b as shown in FIG. 5. In some embodiments, the protrusions have a minimum width corresponding to the width of anode tabs (1-1) or cathode tabs (3-2). In some embodiments, the first and second protrusions are connected with each other and form a single protrusion (2-3) as shown in FIG. 2. In some embodiments, the width of the single protrusion (2-3) has a width not greater than the width of the electrode layers.

In some embodiments, the protrusions have a thickness of c as shown in FIG. 5. In some embodiments, the protrusion has a unique or variable thickness. In some embodiments, the protrusion has a thickness in a range from 25% to 125%, from 25% to 100%, from 25% to 75%, from 50% to 125%, from 50% to 100%, from 75% to 100%, or from 75% to 100% of the thickness of the electrolyte layer. In some embodiments, the cathode layer has a thickness in a range from 1 µm to 1000 µm. In some embodiments, the cathode layer has a thickness in a range from 1 µm to 850 µm, from 1 µm to 650 µm from 1 µm to 500 µm, from 1 µm to 300 µm, or from 1 µm to 250 µm. In some embodiments, the cathode layer has a thickness in a range from 5 µm to 1000 µm, from 10 µm to 1000 µm from 15 µm to 1000 µm, from 25 µm to 1000 µm, from 50 µm to 1000 µm, from 75 µm to 1000 µm, from 100 µm to 1000 µm, from 150 µm to 1000 µm, or from 200 µm to 1000 µm. In some embodiments, the cathode layer has a thickness in a range from 10 µm to 800 µm, from 15 µm to 650 µm from 20 µm to 500 µm, from 25 µm to 300 µm, from 75 µm to 300 µm, or from 100 µm to 300 µm.

In some embodiments, the anode layer has a thickness in a range from 1 µm to 1000 µm. In some embodiments, the anode layer has a thickness in a range from 1 µm to 850 µm, from 1 µm to 650 µm, from 1 µm to 500 µm, from 1 µm to 300 µm, or from 1 µm to 250 µm. In some embodiments, the anode layer has a thickness in a range from 5 µm to 1000 µm, from 10 µm to 1000 µm, from 15 µm to 1000 µm, from 25 µm to 1000 µm, from 50 µm to 1000 µm, or from 75 µm to 1000 µm. In some embodiments, the anode layer has a thickness in a range from 1 µm to 500 µm, from 2 µm to 500 µm, from 5 µm to 500 µm, from 7 µm to 500 µm, from 10 µm to 500 µm, from 10 µm to 450 µm, from 12 µm to 400 µm, from 15 µm to 400 µm, from 15 µm to 350 µm, from 20 µm to 300 µm, from 20 µm to 250 µm, from 20 µm to 200 µm, from 25 µm to 200 µm, from 25 µm to 150 µm, or from 25 µm to 100 µm.

In some embodiments, the solid electrolyte layer has a thickness in a range from 1 µm to 1000 µm. In some embodiments, the solid electrolyte layer has a thickness in a range from 1 µm to 850 µm, from 1 µm to 650 µm, from 1 µm to 500 µm, from 1 µm to 300 µm, from 1 µm to 250 µm, from 1 µm to 200 µm, or from 11 µm to 150 µm. In some embodiments, the solid electrolyte layer has a thickness in a range from 5 µm to 1000 µm, from 10 µm to 1000 µm, from 15 µm to 1000 µm, from 25 µm to 1000 µm, from 50 µm to 1000 µm, or from 75 µm to 1000 µm. In some embodiments, the solid electrolyte layer has a thickness from 10 µm to 500 µm, from 10 µm to 450 µm, from 15 µm to 400 µm, from 15 µm to 350 µm, from 20 µm to 300 µm, from 20 µm to 250 µm, from 20 µm to 200 µm, from 25 µm to 200 µm, from 25 µm to 150 µm, or from 25 µm to 100 µm.

In some embodiments, the protrusion has a length in a range from 1 µm to 3000 µm. In some embodiments, the protrusion has a length in a range from 10 µm to 3000 µm, from 20 µm to 3000 µm, from 50 µm to 3000 µm, from 100 µm to 3000 µm, from 150 µm to 3000 µm, from 200 µm to 3000 µm, from 250 µm to 3000 µm, from 300 µm to 3000 µm, from 500 µm to 3000 µm, from 500 µm to 2500 µm, or from 500 µm to 2000 µm. In some embodiments, the protrusion has a length in a range from 20 µm to 2500 µm, from 50 µm to 2500 µm, from 100 µm to 2500 µm, from 150 µm to 2500 µm, from 200 µm to 2500 µm, from 250 µm to 2500 µm, from 300 µm to 2500 µm, from 350 µm to 2500 µm, from 400 µm to 2500 µm, or from 450 µm to 2500 µm. In some embodiments, the protrusion has a length in a range from 25 µm to 2000 µm, from 50 µm to 2000 µm, from 100 µm to 2000 µm, from 150 µm to 2000 µm, from 200 µm to 2000 µm, from 250 µm to 2000 µm, from 300 µm to 2000 µm, from 350 µm to 2000 µm, from 400 µm to 2000 µm, or from 450 µm to 2000 µm, or from 500 µm to 2000 µm. In some embodiments, the protrusion has a length in a range from 25 µm to 1500 µm, from 50 µm to 1500 µm, from 100 µm to 1500 µm, from 150 µm to 1500 µm, from 200 µm to 1500 µm, from 250 µm to 1500 µm, from 300 µm to 1500 µm, from 350 µm to 1500 µm, from 400 µm to 1500 µm, or from 450 µm to 1500 µm, or from 500 µm to 1500 µm.

In some embodiments, the protrusion has a width in a range from 0.1 mm to 50 mm. In some embodiments, the protrusion has a width in a range from 0.1 to 40 mm, from 0.2 to 40 mm, from 0.5 to 40 mm, from 1.0 to 40 mm, from 2.0 to 40 mm, from 4.0 to 40 mm, from 5.0 to 40 mm, from 7.5 to 40 mm, or from 10 to 40 mm. In some embodiments, the protrusion has a width in a range from 0.1 to 30 mm, from 0.2 to 30 mm, from 0.5 to 30 mm, from 1.0 to 30 mm, from 2.0 to 30 mm, from 4.0 to 30 mm, from 5.0 to 30 mm, from 7.5 to 30 mm, or from 10 to 30 mm. In some embodiments, the protrusion has a width in a range from 0.1 to 20 mm, from 0.2 to 20 mm, from 0.5 to 20 mm, from 1.0 to 20 mm, from 2.0 to 20 mm, from 4.0 to 20 mm, from 5.0 to 20 mm, from 7.5 to 20 mm, or from 10 to 20 mm. In some embodiments, the width of the protrusion is highly dependent on the configuration. As for a wide protrusion as representatively shown in FIG. 2, the protrusion may have a width up to the full width of the solid electrolyte layer. In some embodiments, the protrusion has a width in a range from 50 to 2000 mm, from 100 to 2000 mm, from 250 to 2000 mm, from 500 to 2000 mm, or from 750 to 2000 mm. In some embodiments, the protrusion has a width in a range from 100 to 1500 mm, from 250 to 1500 mm, from 500 to 1500 mm, or from 750 to 1500 mm.

In some embodiments, the protrusion, either the first or second protrusion, is connected or coupled with the solid electrolyte layer via a notched neck to facilitate the folding or arrangement of the protrusions. Representative notched necks are shown in FIGS. 6A-6F. In some embodiments, the notched neck comprises a defect on one side of the protrusion as representatively shown in FIGS. 6B, 6E and 6F. In some embodiments, the notched neck comprises a defect on two sides of the protrusion as representatively shown in FIGS. 6A, 6C and 6D. In some embodiments, the notched neck is a U-shaped (e.g., FIG. 6B), V-shaped (e.g., FIG. 6F), triangular (e.g., FIG. 6E), semi-circular, or rectangular (e.g., FIG. 6A) defect on one side of the protrusion, particularly near the portion next to the electrolyte layer. In some embodiments, the notched neck is a rectangular (e.g., FIG. 6C), triangular, U-shaped (e.g. FIG. 6D), V-shaped, semi-circular, or defect on two opposite or adjacent sides at a portion of the protrusion next to the electrolyte layer. In some embodiments, the notched neck is a cylinder whose cross-section is smaller than that of the protrusion. In some embodiments, the notched neck is a circular defect on both sides at a portion of the protrusion neck to the electrolyte layer. In some embodiments, the notched neck is formed during preparation of the electrolyte layer such as compression molding. In some embodiments, the notched neck is formed by cutting after preparation of the electrolyte layer.

Figure 7A:
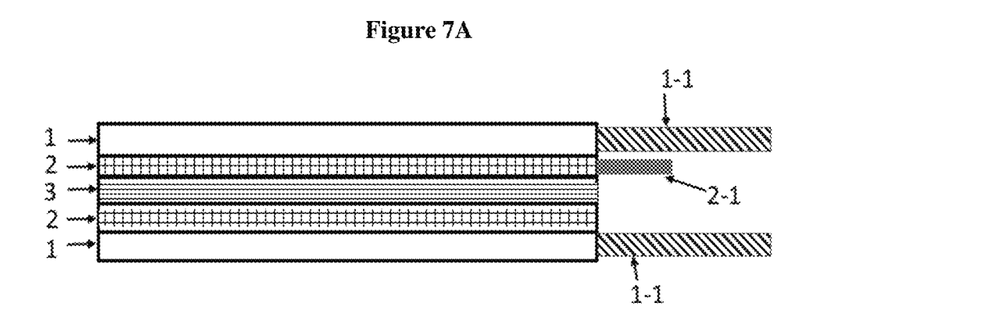
FIGS. 7A and 7B show a representative configuration of a cell assembly before and after folding the tabs, respectively, according to one embodiment of the present disclosure.
Figure 7B:
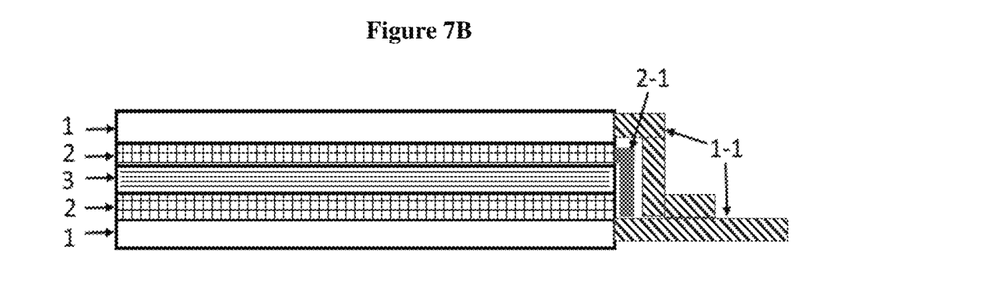
Figure 8A:
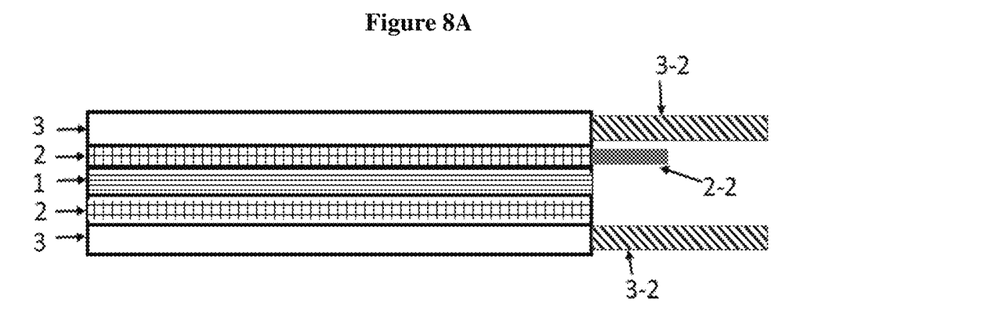
FIGS. 8A and 8B show a representative configuration of a cell assembly before and after folding the tabs, respectively, according to one embodiment of the present disclosure.
Figure 8B:
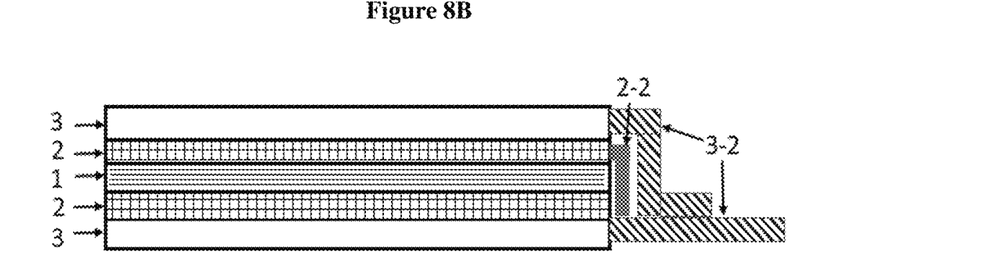

In some embodiments, each of the electrolyte layers in a cell assembly has a first and second protrusions (2-1 and 2-2), as typically shown in FIG. 1B. In some embodiments, each of the electrolyte layers in a cell assembly has a combined protrusion, as typically shown in FIG. 2. In some embodiments, the electrolyte layers are a combination of both. In some embodiments, some of the electrolyte layers in a cell assembly have no protrusions as typically shown in FIGS. 7A-7B and 8A-8B, if the protrusions on the other electrolyte layer is sufficiently long. FIG. 7A shows two electrolyte layers (2) on opposing sides of a cathode layer (3) and that a first protrusion (2-1) is extended from the first electrolyte layer (2) from the top while there is no protrusion on the second electrolyte layer. As shown in FIG. 7B, the folding of the anode tab (1-1) causes the folding of the first protrusion (2-1) and the folded first protrusion is positioned so that it covers cathode layer (3) and the electrolyte layer below the cathode layer. Similarly, FIG. 8A shows two electrolyte layer (2) on opposing sides of an anode layer (1) and that a second protrusion (2-2) is extended from the first electrolyte layer from the top while there is no protrusion on the second electrolyte layer. As shown in FIG. 8b, the folding of the cathode tab (3-2) causes the folding of the second protrusion (2-2) and the folded second protrusion is positioned so that it covers anode layer (1) and the electrolyte layer below the anode layer.

Figure 9:
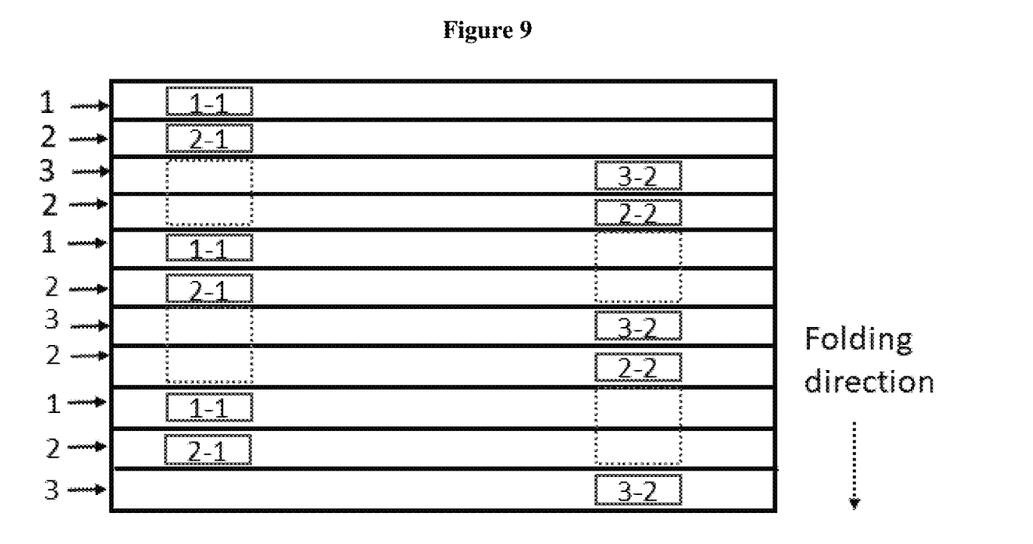
FIG. 9 shows a representative configuration of a cell assembly according to one embodiment of the present disclosure.
Figure 10A:
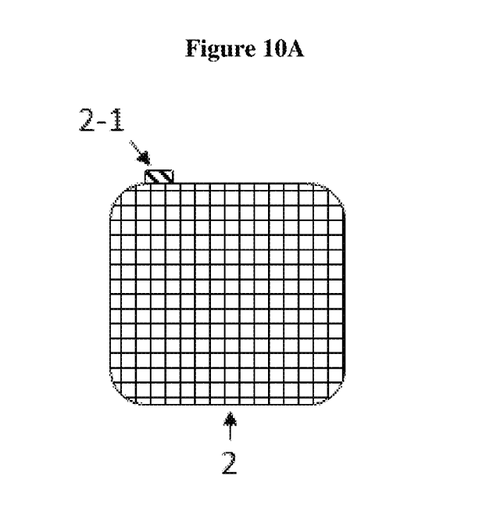
FIGS. 10A and 10B show a representative solid electrolyte layer according to one embodiment of the present disclosure.
Figure 10B:
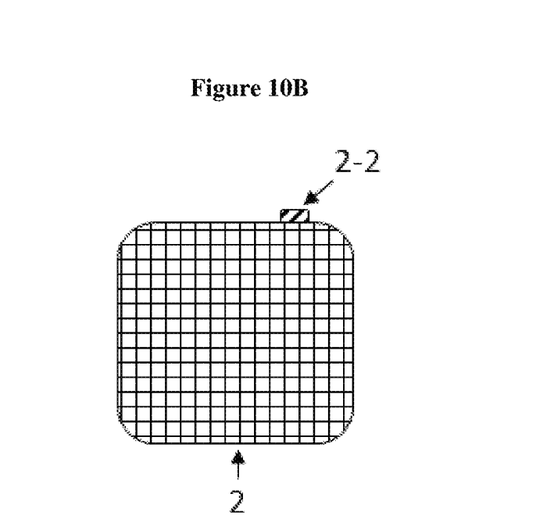

In some embodiments, each of the electrolyte layers in the cell assembly has one protrusion. As shown in FIG. 9, each of the electrolyte layers has one protrusion, either 2-1 or 2-2. When the electrode tabs are folded downward, the protrusions would be folded and occupy an area marked as dashed boxes in FIG. 9. In some embodiments, the electrolyte layer with a single protrusion has a configuration as shown in FIGS. 10A-10B. In some embodiments, the protrusion (2-1) in FIG. 10A is the same as the protrusion (2-2) in FIG. 10B if these two protrusions are designed symmetrically. In some embodiments, the solid electrolyte layer with a protrusion (2-1) in FIG. 10A can turn over and form the solid electrolyte layer with a protrusion (2-2) in FIG. 10B. In some embodiments, protrusion (2-1) and protrusion (2-2) are different sizes and/or shapes.

In some embodiments, this disclosure provides a cell assembly comprising:
a) a plurality of first electrodes each comprising a first electrode tab extended therefrom;
b) a plurality of second electrodes; and
c) one or more first solid electrolyte layers each comprising a first protrusion, wherein the number of the one or more first solid electrolyte layers ($N1_{SE}$) is no more than that of all solid electrolyte layers ($N_{SE}$) in the cell assembly ($1 \leq N1_{SE} \leq N_{SE}$),
wherein a first solid electrolyte layer comprising a first protrusion is sandwiched between one of the first electrodes and one of the second electrodes, and
wherein the first electrode tab of the one of the first electrodes contacts another first electrode tab of another first electrode, and
wherein the first protrusion of the first solid electrolyte layer is positioned to separate the first electrode tab of the one of the first electrodes from the one of the second electrodes to prevent a short circuit therebetween.

As representatively shown in FIG. 9, the cell assembly contains 5 solid electrolyte layers, i.e., $N_{SE}=5$, and there are 3 first solid electrolyte layers with the first protrusions, i.e., $N1_{SE}=3$.

In some embodiments, the cell assembly comprises one or more first and second solid electrolyte layers each comprising a first and second protrusions, respectively. In one embodiment, the numbers of the first and second solid electrolyte layers are $N1_{SE}$ and $N2_{SE}$, respectively, wherein $1 \leq N1_{SE} \leq N_{SE}$, and $1 \leq N2_{SE} \leq N_{SE}$. In some embodiments, a solid electrolyte layer may only include the first protrusion as typically shown in FIG. 9. In some embodiments, a solid electrolyte layer may include the first and second protrusions as shown in FIG. 11.

Figure 11:
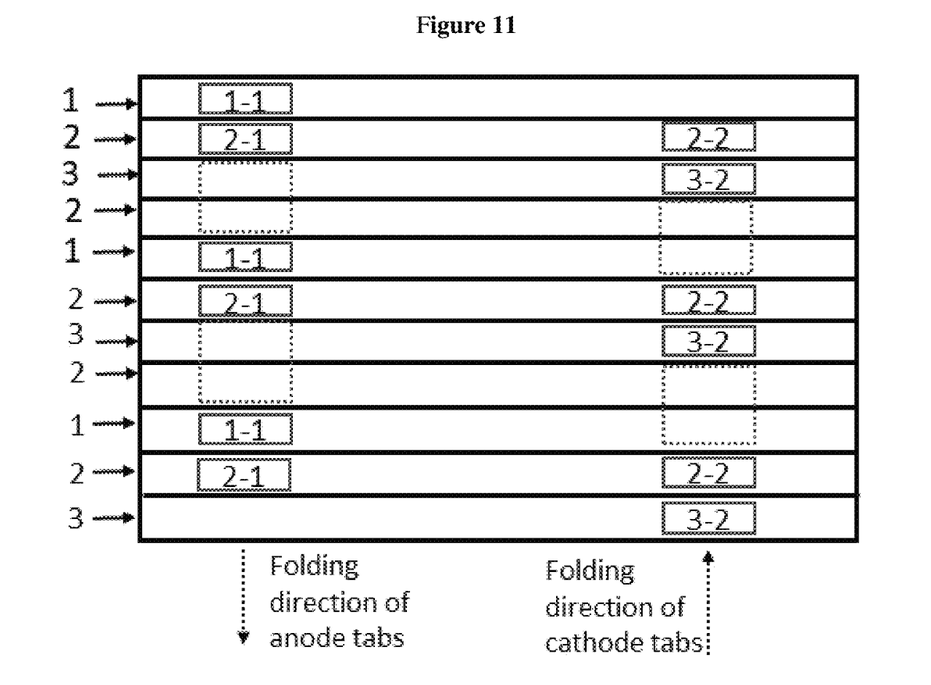
FIG. 11 shows a representative configuration of a cell assembly according to one embodiment of the present disclosure.

FIG. 11 shows a cell assembly comprising some solid electrolyte layers with two protrusions and some solid electrolyte layers with no protrusions. FIG. 11 also shows that the folding direction of anode tabs are different from that of the cathode tabs while FIG. 9 shows a configuration that anode tabs and cathode tabs share the same folding direction.

In some embodiments, the anode layer includes an anode active material. Non-limiting specific anode active materials include lithium metal, a lithium alloy, graphite, graphene and their modifications and derivatives. The modifications and derivatives include coating or mixing with another material or surface modifications via chemical, physical bonds or a combination thereof. In some embodiments, the anode layer also includes a collector on which the anode active material is positioned. In some embodiments the collector of the anode layer may include the anode tabs (1-1).

In some embodiment, the cathode layer comprises a cathode active material (CAM). Non-limiting specific cathode active materials include $Li_xMn_{1-y}M_yA_2$ (Formula 1), $Li_xMn_{1-y}M_yO_{2-z}X_z$ (Formula 2), $Li_xMn_2O_{4-z}X_z$ (Formula 3), $Li_xMn_{2-y}M_yA_4$ (Formula 4), $Li_xCo_{1-y}M_yA_2$ (Formula 5), $Li_xCo_{1-y}M_yO_{2-z}X_z$ (Formula 6), $Li_xNi_{1-y}M_yA_2$ (Formula 7), $Li_xNi_{1-y}M_yO_{2-z}X_z$ (Formula 8), $Li_xNi_{1-y}Co_yO_{2-z}X_z$ (Formula 9), $Li_xNi_{1-y-z}Co_yM_zA_a$ (formula 10), $Li_xNi_{1-y-z}Co_yM_zO_{2-a}X_a$ (Formula 11), $Li_xNi_{1-y-z}Mn_yM_zA_a$ (Formula 12), $Li_xNi_{1-y-z}Mn_yM_zO_{2-a}X_a$ (Formula 13), wherein $0.95 \leq x \leq 1.1$, $0 \leq y \leq 0.5$, $0 \leq z \leq 0.5$, $0 \leq a \leq 2$; M is selected from the group consisting of Al, Ni, Co, Mn, Cr, Fe, Mg, Sr, V, and rare earth elements; A is selected from the group consisting of O, F, S, and P; and X is selected from the group consisting of F, S, and P. In some embodiments, the CAM particles have an average diameter of 1-15 μm. It has a concentration of between 50 wt % and 99 wt % in the cathode layer. In some embodiments, the cathode layer also includes a collector on which the cathode active material is positioned. In some embodiments the collector of the cathode layer may include the cathode tabs 3-2.

In some embodiment, the solid electrolyte layer is a sulfide solid electrolyte. In some embodiments, the sulfide solid electrolyte may be any of crystalline material, glass ceramic, glass, or a combination thereof. Examples of the sulfide solid electrolyte include $Li_2S$—$P_2S_5$, $Li_2S$—$P_2S_5$—LiHa ("Ha" is one or more halogen elements), $Li_2S$—$P_2S_5$—$P_2O_5$, $Li_2S$—$Li_3PO_4$—$P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, and $Li_{7-x}PS_{6-x}Ha_x$ (argyrodite-type solid electrolyte), "Ha" is one or more halogen elements, wherein x is the molar fraction of the halogen and has a value in a range from 0.2 to 1.8.

In some embodiments, the anode tabs are folded to a first direction and the cathode tabs are folded to a second direction. In some embodiments, the first direction and second direction are the same or different.

In one aspect, the present disclosure provides a cell assembly comprising:
a) a plurality of first electrodes, wherein each first electrode comprises a first electrode tab extended therefrom;
b) a solid electrolyte layer comprising a first protrusion; and c) a second electrode,
wherein the solid electrolyte layer is positioned between one of the plurality of first electrodes and the second electrode, and
wherein the first electrode tab of the one of the plurality of first electrodes contacts another of the plurality of first electrodes, and
wherein the first protrusion of the solid electrolyte layer is positioned to separate the first electrode tab of the one of the plurality of first electrodes from the second electrode to prevent a short circuit therebetween.

In some embodiments, this disclosure provides a cell assembly comprising a plurality of first electrodes each comprising a first electrode tab, a plurality of second electrodes each comprising a second electrode tab, one or more solid electrolyte layers each comprising a first protrusion and a second protrusion, wherein a solid electrolyte layers comprising a first and second protrusions is sandwiched between one of the second electrodes and one of the first electrodes, the second protrusion on the electrolyte layer is positioned to separate the second electrode tab of the one of the second electrodes from the one of the first electrodes to prevent a short circuit therebetween.

In some embodiments, the cell assembly comprises the solid electrolyte layer comprising the first protrusion and a second solid electrolyte comprising a second protrusion, wherein the second electrolyte layer is sandwiched between the second electrode and another of the plurality of first electrodes, and the second protrusion on the second solid electrolyte layer is positioned to separate the second electrode tab of the second electrode from the another of the first electrodes to prevent a short circuit therebetween.

Figure 12:
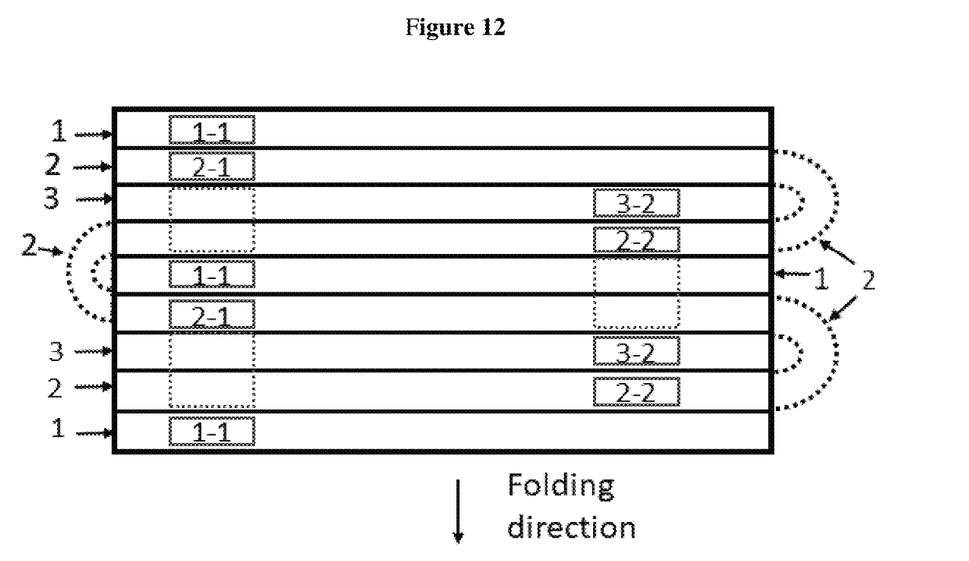
FIG. 12 shows a representative cell assembly comprising a Z-stacked solid electrolyte layer according to one embodiment of the present disclosure.

In some embodiments, the present disclosure also applies to a cell assembly comprising one cathode, one anode and one solid electrolyte layer. In some embodiments, a single electrode is stacked or winded into a configuration with multiple layers wherein one or more electrode tabs are distributed along one edge of the electrode layer. In some embodiments, a single electrolyte is stacked or winded into multiple layers wherein one or more protrusions are distributed along one edge of the electrolyte layer. In some embodiments, the one or more protrusions are spatially aligned with the electrode tabs. In some embodiments, the electrodes and electrolyte layers are separate sheets which are stacked together as typically shown in FIGS. 3A and 3B. In some embodiments, the electrolyte layer with one or more protrusions as disclosed herein is also applicable to a cell assembly prepared by a Z-stacking process. In one embodiment, a cell assembly with a Z-stacking comprises a single electrolyte layer which forms multiple electrolyte sections after the Z-stacking. As typically shown in FIG. 12, a single solid electrolyte layer is stacked into a Z-shape configuration and forms multiple electrolyte sections. Each section is like a solid electrolyte sheet and is sandwiched between a first electrode sheet and a second electrode sheet. In some embodiments, this disclosure is also applicable to a cell assembly prepared by cylindrical or prismatic windings, wherein the an assembly of first electrode/electrolyte layer/second electrode is rolled into a cylindrical shape or winded into a prismatic shape, one or more protrusions are distributed along one edge of the solid electrolyte layer, and one of the one or more protrusions are positioned to separate a first electrode tab on a portion of the first electrode from a portion of the second electrode to prevent a short circuit therebetween.

In some embodiments, the cell assemblies disclosed herein may be incorporated into an electrochemical device, for example an all-solid-state battery.

In one aspect, the present disclosure provides a method for preparing the cell assembly. In some embodiments, the method include:
1) providing a plurality of first electrodes, wherein each first electrode comprises a first electrode tab extended therefrom;
2) providing a plurality of solid electrolyte layers, wherein at least one of the solid electrolyte layers comprises a first protrusion;
3) providing a plurality of second electrodes, wherein each second electrode comprises a second electrode tab extended therefrom;
4) stacking the plurality of first electrodes, the plurality of solid electrolyte layers, and the plurality of second electrodes in a pattern of one of a plurality of first electrodes, one of the plurality of solid electrolyte layers, and one of the plurality of second electrodes to form a cell assembly, wherein each first electrode tab has one of the first protrusions aligned with it; and
5) folding each first electrode tab, which causes the first protrusion aligned with the each first electrode tab to be positioned to separate the first electrode tab from the second electrodes, thereby preventing contacting and minimizing short circuits.

In some embodiments, the first electrode tabs are welded or otherwise joined together to electrically connect the first electrode tabs. In some embodiments, the second electrode tabs are welded or otherwise joined together to electrically connect the second electrode tabs. In some embodiments, the electrode tabs may be joined together with ultrasonic welding. As disclosed above, in some embodiments, the stack can include solid electrolyte layers having a first protrusion only, a second protrusion only, or both a first protrusion and a second protrusion.

In some embodiments, the first protrusions prevent the short circuit between the first electrode tabs and the second electrodes and/or second protrusions prevent a short circuit between the second electrode tabs and the first electrodes. In some embodiments, the first electrodes are anodes or cathodes. In some embodiments, the second electrodes are anodes or cathodes.

In some embodiments, the present disclosure provides a method for preparing a solid electrolyte layer with one or more protrusions. The method may include loading a solid electrolyte layer on a separator, cutting the solid electrolyte layer with the separator such that the cut shape includes one or more protrusions, and separating the solid electrolyte layer from the separator, thus obtaining the solid electrolyte layer with one or more protrusions. In some embodiments, the solid electrolyte layer is prepared in the absence of the separator.

In some embodiments, the folding of first and/or second electrode tabs may be accomplished using a tool or mold to apply pressure to fold the tabs. The folding of the first and/or second electrode tabs may also cause the folding, movement, or positioning of the respective first or second protrusion as well. In some embodiments, isostatic pressure may be used. In some embodiments, the pressure may be in a range from 200 MPa to 1,000 MPa, 300 MPa to 1,000 MPa, 400 MPa to 1,000 MPa, 500 MP to 1,000 MPa, or any and all ranges and subranges there between. The pressure may be applied for a sufficient amount or period of time for example in a range from 1 minute to 120 minutes, 5 minutes to 120 minutes, 10 minutes to 120 minutes, 30 minutes to 120 minutes, 45 minutes to 120 minutes, 60 minutes to 120 minutes, or any and all ranges and subranges therebetween. The pressure may also be applied will also providing heat, for example in a range from 40° C. to 100° C., 50° C. to 100° C., 60° C. to 100° C., 70° C. to 100° C., or any and all ranges and subranges therebetween.

In some embodiments, the cell assembly may be sealed in a pouch. In some embodiments, the pouch may be incorporated into an electrochemical device.

In some embodiments, the cell assemblies are tested for presence of a short circuit by measuring the open circuit voltage (OCV) across the electrode tabs. The cell assemblies as provided in the present disclosure exhibit reduced short circuits.

It is to be noted that the transitional term "comprising", which is synonymous with "including", "containing" or "characterized by", is inclusive or open-ended and does not exclude additional, un-recited elements or method steps.

In a first aspect of the disclosure, a cell assembly comprises: a plurality of first electrode, wherein each first electrode comprises a first electrode tab extended therefrom; a solid electrolyte layer comprising a first protrusion; and a second electrode, wherein the solid electrolyte layer is positioned between one of the plurality of first electrodes and the second electrode, and wherein the first electrode tab of the one of the plurality of first electrodes contacts another of the plurality of first electrodes, and wherein the first protrusion of the solid electrolyte layer is positioned to separate the first electrode tab of the one of the plurality of first electrodes from the second electrode to prevent a short circuit therebetween.

In a second aspect according to the first aspect, the cell assembly further comprises: a plurality of the solid electrolyte layers, wherein each of the plurality of solid electrolyte layers comprises the first protrusion and a second protrusion; and a plurality of the second electrodes, wherein each of the plurality of second electrodes comprises a second electrode tab, wherein the second electrode tab of one of the plurality of second electrodes contacts another of the plurality of second electrodes, and wherein one of the plurality of the solid electrolyte layers is positioned between the one of the plurality of second electrodes and one of the plurality of first electrodes and wherein the second protrusion is positioned to separate the second electrode tab of the one of the plurality of second electrodes from the one of the plurality of first electrodes to prevent a short circuit therebetween.

In a third aspect according to the first aspect, the cell assembly further comprises a second solid electrolyte layer positioned between the second electrode and the another of the plurality of first electrodes, wherein the second solid electrolyte layer has a first protrusion and the first protrusion of the solid electrolyte layer and the first protrusion of the second solid electrolyte layer are positioned to separate the first electrode tab of the one of the plurality of first electrodes from the second electrode.

In a fourth aspect according to any preceding aspect, all the first electrode tabs are electrically connected together.

In a fifth aspect according to any preceding aspect, the first protrusion has a composition that is the same as or different from that of the solid electrolyte layer.

In a sixth aspect according to any preceding aspect, the first protrusion has a minimum length that covers the second electrode and has a maximum length that covers the second electrode and another solid electrolyte layer below the second electrode.

In a seventh aspect according to any preceding aspect, the first protrusion has a thickness in a range from 50% to 100% of the thickness of the solid electrolyte layer.

In an eighth aspect according to any preceding aspect, the first protrusion has a minimum width corresponding to the width of the first electrode tab.

In a ninth aspect according to any preceding aspect, the first protrusion is connected to the solid electrolyte layer via a notched neck.

In a tenth aspect according to the ninth aspect, the first electrode tabs are folded in a first direction and the second electrode tabs are folded in a second direction.

In an eleventh aspect according to any preceding aspect, the plurality of first electrodes are anodes and the second electrode is a cathode.

In a twelfth aspect according to any of the first through eleventh aspects, the plurality of first electrodes are cathodes and the second electrode is an anode.

In a thirteenth aspect of the disclosure, an electrochemical device comprises the cell assembly of any preceding aspect.

In a fourteenth aspect of the disclosure, a method for preparing a cell assembly comprises: providing a plurality of first electrodes, wherein each first electrode comprises a first electrode tab extended therefrom; providing a plurality of solid electrolyte layers, wherein at least one of the solid electrolyte layers comprises a first protrusion; providing a plurality of second electrodes, wherein each second electrode comprises a second electrode tab extended therefrom; stacking the plurality of first electrodes, the plurality of solid electrolyte layers, and the plurality of second electrodes in a pattern of one of a plurality of first electrodes, one of the plurality of solid electrolyte layers, and one of the plurality of second electrodes to form a cell assembly, wherein each first electrode tab is aligned with one of the first protrusions; and folding each first electrode tab, which causes the first protrusion aligned with the each first electrode tab to be positioned to separate the first electrode tab from the second electrodes.

In a fifteenth aspect according to the fourteenth aspect, the method further comprises welding the first electrode tabs together.

In a sixteenth aspect according to the fourteenth or fifteenth aspect, the method further comprises sealing the cell assembly in a pouch.

In a seventeenth aspect according to any of the fourteenth through sixteenth aspects, the method further comprises applying a compression on the cell assembly at a temperature for a period of time.

In an eighteenth aspect according to the seventeenth aspect, the compression is applied isostatically.

In a nineteenth aspect according to the seventeenth or eighteenth aspect, wherein the temperature is in a range from 40 to 100° C.

In a twentieth aspect according to any of the seventeenth through nineteenth aspects, the period of time is in a range from 1 to 120 min.

In a twenty-first aspect according to any of the seventeenth through twentieth aspects, the compression is in a range from 200 to 1000 MPa.

We claim:

1. A cell assembly comprising:
   a) a plurality of first electrodes, wherein each first electrode comprises a first electrode tab extended therefrom;
   b) a solid electrolyte layer comprising a first protrusion; and
   c) a second electrode, wherein the solid electrolyte layer is positioned between one of the plurality of first electrodes and the second electrode, and wherein the first electrode tab of the one of the plurality of first electrodes contacts another of the plurality of first electrodes, and wherein the first protrusion of the solid electrolyte layer is positioned, upon folding, to separate the first electrode tab of the one of the plurality of first electrodes from the second electrode to prevent a short circuit therebetween.

2. The cell assembly of claim 1, further comprising:

a plurality of the solid electrolyte layers, wherein each of the plurality of solid electrolyte layers comprises the first protrusion and a second protrusion; and a plurality of the second electrodes, wherein each of the plurality of second electrodes comprises a second electrode tab, wherein the second electrode tab of one of the plurality of second electrodes contacts another of the plurality of second electrodes, and wherein one of the plurality of the solid electrolyte layers is positioned between the one of the plurality of second electrodes and one of the plurality of first electrodes and wherein the second protrusion is positioned to separate the second electrode tab of the one of the plurality of second electrodes from the one of the plurality of first electrodes to prevent a short circuit therebetween.

3. The cell assembly of claim 1, further comprising a second solid electrolyte layer positioned between the second electrode and the another of the plurality of first electrodes, wherein the second solid electrolyte layer has a first protrusion and the first protrusion of the solid electrolyte layer and the first protrusion of the second solid electrolyte layer are positioned to separate the first electrode tab of the one of the plurality of first electrodes from the second electrode.

4. The cell assembly of claim 1, wherein all the first electrode tabs are electrically connected together.

5. The cell assembly of claim 1, wherein the first protrusion has a composition that is the same as or different from that of the solid electrolyte layer.

6. The cell assembly of claim 1, wherein the first protrusion has a minimum length that covers the second electrode and has a maximum length that covers the second electrode and another solid electrolyte layer below the second electrode.

7. The cell assembly of claim 1, wherein the first protrusion has a thickness in a range from 50% to 100% of the thickness of the solid electrolyte layer.

8. The cell assembly of claim 1, wherein the first protrusion has a minimum width corresponding to the width of the first electrode tab.

9. The cell assembly of claim 1, wherein the first protrusion is connected to the solid electrolyte layer via a notched neck.

10. The cell assembly of claim 2, wherein the first electrode tabs are folded in a first direction and the second electrode tabs are folded in a second direction.

11. The cell assembly of claim 1, wherein the plurality of first electrodes are anodes and the second electrode is a cathode.

12. The cell assembly of claim 1, wherein the plurality of first electrodes are cathodes and the second electrode is an anode.

13. An electrochemical device comprising the cell assembly of claim 1.

14. A method for preparing a cell assembly comprising:
a) providing a plurality of first electrodes, wherein each first electrode comprises a first electrode tab extended therefrom;
b) providing a plurality of solid electrolyte layers, wherein at least one of the solid electrolyte layers comprises a first protrusion;
c) providing a plurality of second electrodes, wherein each second electrode comprises a second electrode tab extended therefrom;
d) stacking the plurality of first electrodes, the plurality of solid electrolyte layers, and the plurality of second electrodes in a pattern of one of a plurality of first electrodes, one of the plurality of solid electrolyte layers, and one of the plurality of second electrodes to form a cell assembly, wherein each first electrode tab is aligned with one of the first protrusions; and
e) folding each first electrode tab and the first protrusion of the at least one of the solid electrolyte layers, which causes the first protrusion aligned with the each first electrode tab to separate the first electrode tab from the second electrodes.

15. The method of claim 14, further comprising welding the first electrode tabs together.

16. The method of claim 14, further comprising: applying a compression on the cell assembly at a temperature for a period of time.

17. The method of claim 16, wherein the compression is applied isostatically.

18. The method of claim 16, wherein the temperature is in a range from 40 to 100° C.

19. The method of claim 16, wherein the period of time is in a range from 1 to 120 min.

20. The method of claim 16, wherein the compression is in a range from 200 to 1000 MPa.

* * * * *